(12) United States Patent
Marcjan et al.

(10) Patent No.: US 7,930,301 B2
(45) Date of Patent: Apr. 19, 2011

(54) SYSTEM AND METHOD FOR SEARCHING COMPUTER FILES AND RETURNING IDENTIFIED FILES AND ASSOCIATED FILES

(75) Inventors: Cezary Marcjan, Redmond, WA (US); Ryszard Kott, Redmond, WA (US); Surajit Chaudhuri, Redmond, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1570 days.

(21) Appl. No.: 10/403,063

(22) Filed: Mar. 31, 2003

(65) Prior Publication Data

US 2004/0254938 A1    Dec. 16, 2004

(51) Int. Cl.
*G06F 7/00* (2006.01)
(52) U.S. Cl. .................................. 707/732; 707/749
(58) Field of Classification Search .............. 707/3, 100, 707/1, 706, 732, 749; 705/10
See application file for complete search history.

(56) References Cited

U.S. PATENT DOCUMENTS

| | | | |
|---|---|---|---|
| 5,551,024 A | | 8/1996 | Waters |
| 5,630,121 A * | | 5/1997 | Braden-Harder et al. .... 707/102 |
| 5,987,454 A | | 11/1999 | Hobbs |
| 6,493,637 B1 | | 12/2002 | Steeg |
| 6,516,312 B1 | | 2/2003 | Kraft et al. |
| 6,564,209 B1 * | | 5/2003 | Dempski et al. ................. 707/3 |
| 6,704,729 B1 | | 3/2004 | Klein et al. |
| 2002/0087579 A1 | | 7/2002 | Chasanoff et al. |
| 2003/0135490 A1 * | | 7/2003 | Barrett et al. ..................... 707/3 |

FOREIGN PATENT DOCUMENTS

| | | |
|---|---|---|
| JP | 10111870 (A) | 4/1998 |
| JP | 11053392 (A) | 2/1999 |
| JP | 2001352406 (A) | 12/2001 |
| KR | 20010057771 (A) | 7/2001 |
| WO | WO0167282 (A2) | 9/2001 |

OTHER PUBLICATIONS

Helmut Berger, et al., An Adaptive Information Retrieval System based on Associative Networks, APCCM 2004, 2004, pp. 27-36, Dunedin, New Zealand.

(Continued)

*Primary Examiner* — Don Wong
*Assistant Examiner* — Michael Le
(74) *Attorney, Agent, or Firm* — Lee & Hayes, PLLC

(57) ABSTRACT

A search of an index database or another search method is conducted to identify preliminary results listing one or more selected computer objects having selected identifying information stored in an index database. In addition, one or more selected computer objects of the preliminary search results are correlated with one or more other computer objects that have associations with the selected computer objects of the preliminary search results. Integrated search results are then returned and include the preliminary search results and one or more other computer objects that have associations with the selected computer objects of the preliminary search results. The associations may be determined by a association system and represent relationships between computer files based upon user or other interactions between the objects. The associations between the objects may include similarities between them and their importance.

18 Claims, 8 Drawing Sheets

OTHER PUBLICATIONS

Bodo Billerback, et al., Query Expansion using Associated Queries, CIKM'03, Nov. 3-8, 2003, pp. 2-9, New Orleans, Louisiana, USA.

Falk Scholer, et al., Query Association for Effective Retrieval, CIKM'02, Nov. 4-9, 2002, pp. 324-331, McLean, Virginia, USA.

Kemafor Anyanwu, et al., The p Operator: Discovering and Ranking Associations on the Semantic Web, SIGMOD Record, Dec. 2002, pp. 42-47, vol. 31-No. 4.

Mary Jo Foley. "Sapphire" Aims to Make Info Storage More Intutive, http://www.microsoft-watch.com/article2/0,1995,1166890,00.asp, Apr. 18, 2003, last accessed Jun. 20, 2005.

Kyoko Umeda, et al., "Proposal of a Research Information Sharing System Utilizing Knowledge-Memos", Journal of Information Processing Society of Japan, vol. 42, No. 11, pp. 2562-2571, Japan, Nov. 15, 2001.

* cited by examiner

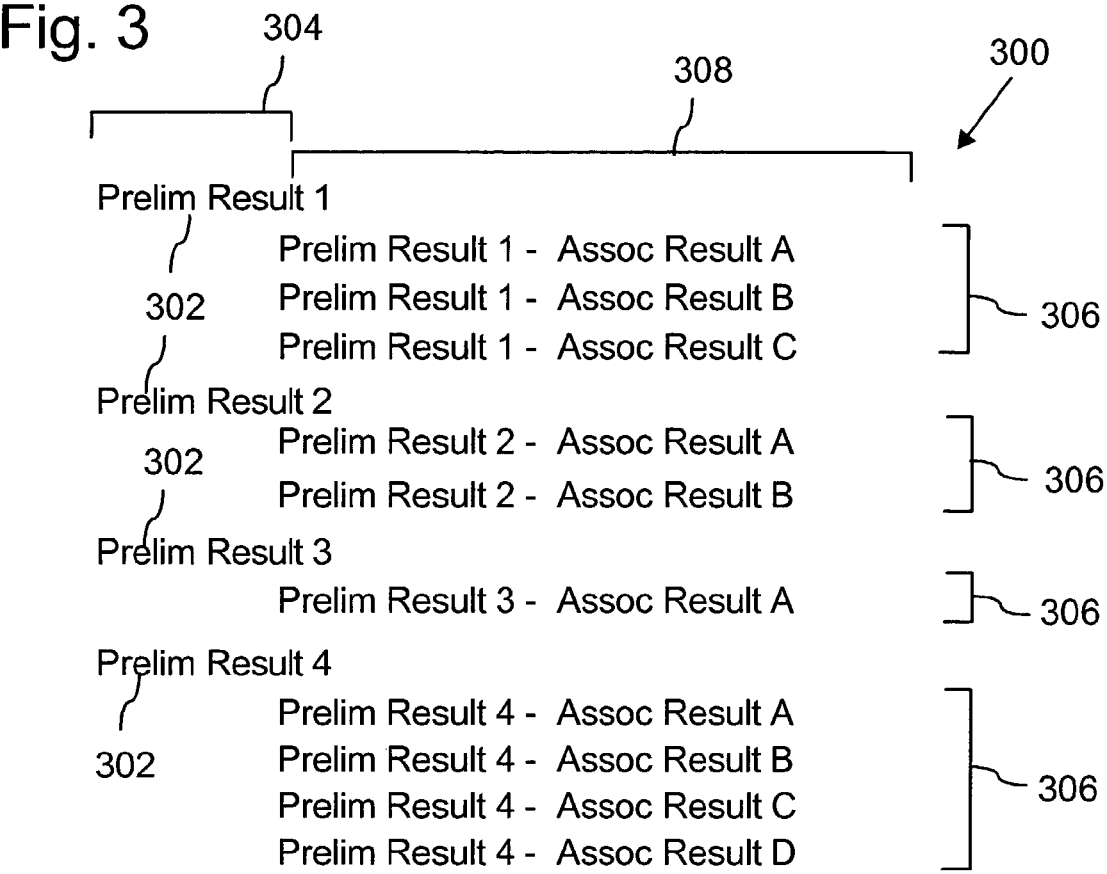
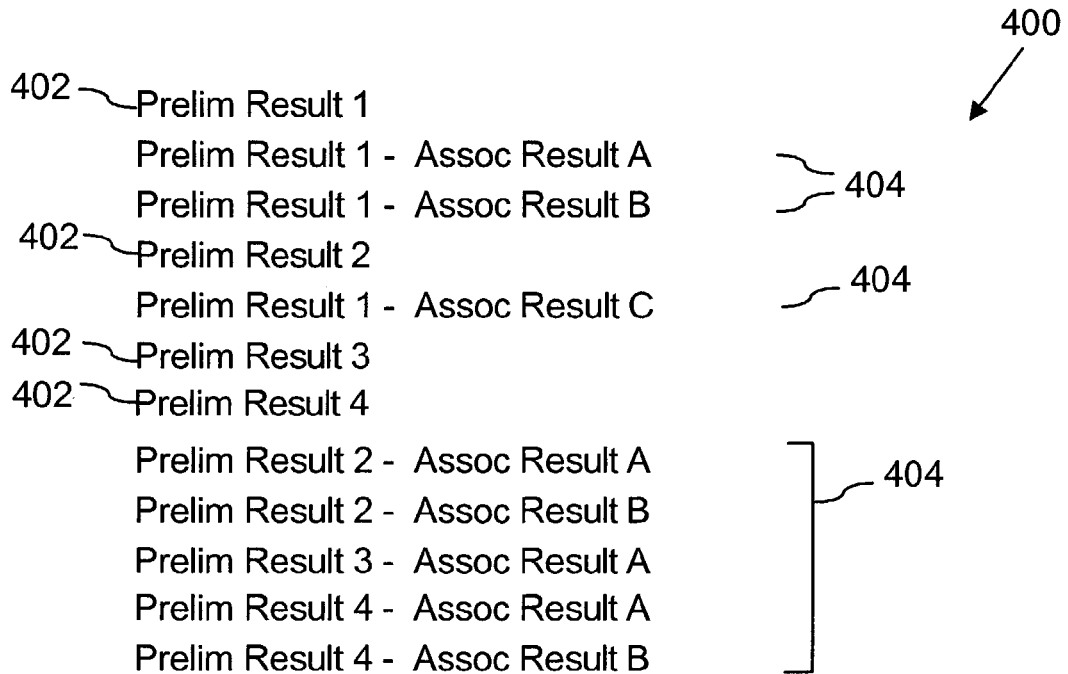

SYSTEM AND METHOD FOR SEARCHING COMPUTER FILES AND RETURNING IDENTIFIED FILES AND ASSOCIATED FILES

TECHNICAL FIELD

The present invention relates to computer searching of files or other objects and, in particular, to computer searching that provides search results that include computer objects having associations with selected text search results.

BACKGROUND AND SUMMARY

Conventional computer text indexing and search systems provide indexing and searching of computer files according to search terms selected by a user. The computer files may be any set of computer files, such as the files stored on a particular computer or a network or the files corresponding to a network-accessible site of linked files (e.g., a Web site).

A text indexing and search system typically includes an indexer that identifies and retrieves from a set of files one or more selected terms and stores or maps the selected terms to records in an index database. A user searching for selected files enters one or more search terms in a search form, which is rendered on a computer display that is accessible by the user. The user initiates a search query, whereby the one or more search terms are sent to a search engine. The search engine searches the index database for records that include the one or more search terms and returns a results listing that identifies the files that at least in part meet the search criteria. The user can then access the identified files.

A limitation of conventional text indexing and search systems is that they are restricted to text-based searching of computer files and objects. Although the text-based searching may relate to different data fields, including file names or text within a file, such searching fails to account for all relationships and associations between computer files and objects.

The present invention provides improved searching of computer files and objects. In one implementation, a search of an index database or a different search method is conducted to identify as a preliminary results listing one or more selected computer objects having selected identifying information stored in an index database. In addition, one or more selected computer objects of the preliminary search results are correlated with one or more other computer objects that have associations with the selected computer objects of the preliminary search results.

Integrated search results are then returned and include the preliminary search results and one or more other computer objects that have associations with the selected computer objects of the preliminary search results. The associations may be determined by an association system and represent relationships between computer files based upon user or other interactions between the objects. The associations between the objects may include similarities between them and their importance.

Additional objects and advantages of the present invention will be apparent from the detailed description of the preferred embodiment thereof, which proceeds with reference to the accompanying drawings.

BRIEF DESCRIPTION OF THE DRAWINGS

FIG. 3 shows a multi-level integrated results listing.

FIG. 4 shows a single-level integrated results listing.

DETAILED DESCRIPTION OF PREFERRED EMBODIMENTS

Figure 1:
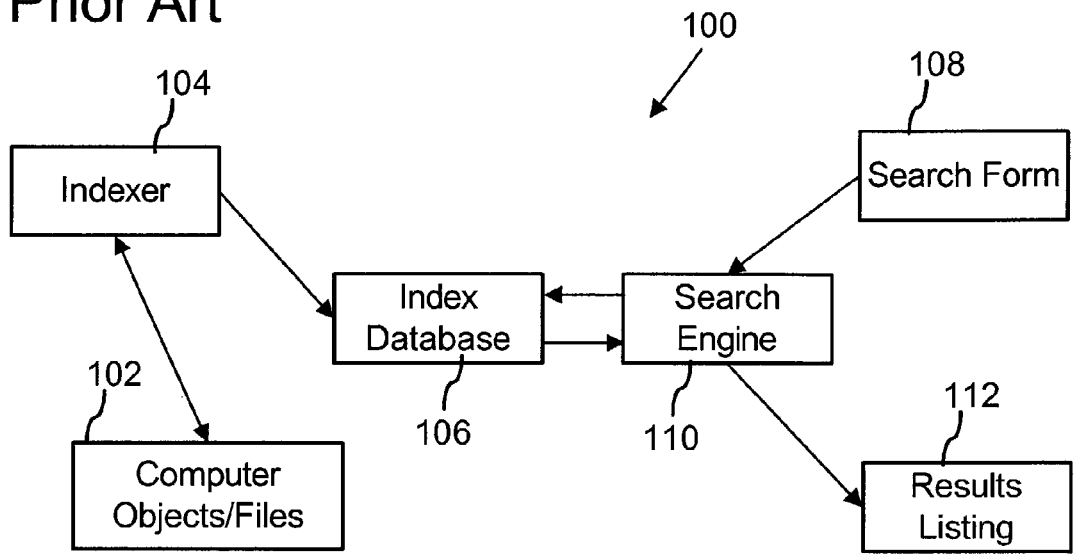
FIG. 1 is a block diagram illustrating a prior art text indexing and search system that provides indexing and searching of computer files.

FIG. 1 is a block diagram illustrating a prior art text indexing and search system 100 that provides indexing and searching of computer files 102. The searching of computer files 102 may be used to identify or access files 102 according to search terms selected by a user. The computer files 102 may be any set of computer files, such as the files stored on a particular computer or a network or the files corresponding to network-accessible site (e.g., a Web site), for example. For purposes of illustration, the following description of FIG. 1 refers to files 102 that correspond to one or more network-accessible sites of linked files (e.g., Web sites).

An indexer 104 identifies and retrieves from files 102 one or more selected terms and stores or maps them to records in an index database 106. For each file the one or more selected terms identified and retrieved by indexer 104 may include any or all of a title, network address, filename, file description, specified keywords, file text, links within the file, etc., or any other information, which are stored with an identifier that identifies the file.

A user searching for one or more selected files enters one or more search terms or other search criteria in a search form 108, which is rendered on a computer display (not shown) accessible by the user. The user initiates a search, whereby a search query with the one or more search terms is sent to a search engine 110. Search engine 110 searches index database 106 for records that include one or more of the search terms and returns a results listing 112 that lists files that at least in part meet the search criteria.

In some systems, the results listing 112 may include relevance rankings for the listed files. The relevance rankings attempt to identify files that are of greatest relevance to the user. The relevance rankings may be calculated in various ways and according to various algorithms, as are known in the art. The user can then access one or more desired files.

Figure 2:
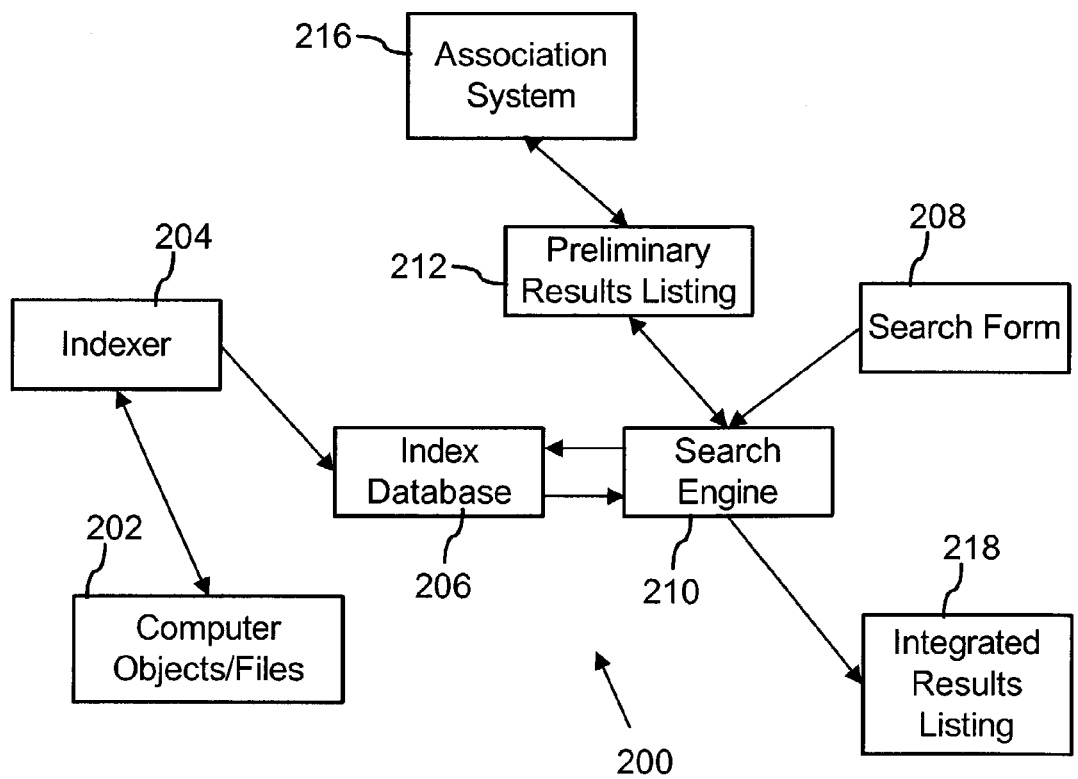
FIG. 2 is a block diagram illustrating an indexing and search system that provides indexing and searching of computer files according to the present invention.

FIG. 2 is a block diagram illustrating an indexing and search system 200 that provides indexing and searching of computer files or objects 202 according to the present invention. The searching of computer files 202 may be used to identify or access files 202 according to search criteria selected by a user. The computer files 202 may be any set of computer files. For example, the files may be dynamically generated on request by, for example, a script (such as a web server script) or as a result of a database query, or may be stored on a particular computer or a network or the files corresponding to one or more network-accessible sites of linked files (e.g., Web sites), for example. For purposes of illustration, the following description of FIG. 2 refers to files 202 that are stored on a computer or a network.

An indexer 204 identifies and retrieves from files 202 one or more selected terms and stores or maps them to records in an index database 206. For each file, the one or more selected criteria identified and retrieved by indexer 204 may include any or all of a title, network address, filename, file description, specified keywords, file text, links within the file, etc., or any other information, which are stored with an identifier that identifies the file.

A user searching for one or more selected files enters one or more search terms or other search criteria in a search form 208, which is rendered on a computer display (not shown) accessible by the user. The user initiates a search, whereby a search query with the one or more search terms or other criteria is sent to a search engine 210. Search engine 210 searches index database 206 for records that include one or more of the search terms or other criteria and returns a preliminary results listing 212 that lists files that at least in part meet the search criteria. In some implementations, preliminary results listing 212 may include relevance rankings for the listed files, as are known in the art. For example, the initial set can be generated by all kinds of queries like: "find files that were created in specified time interval" or "find persons that communicated with me last week" or "find sunny days in last 4 months".

Files in preliminary results listing 212 are correlated with other computer objects (e.g., files, personal contacts, etc.) that have associations with the files. The associations are identified and determined by an automatic association system 216 that automatically determines associations between user computer activities, computer objects (e.g., files, contacts, etc.), and other events. The associations determined by association system 216 represent relationships between computer files (referred to generally as objects), which relationships are based upon user or other interactions between the objects.

As described below, associations between the objects may include similarities between them and their importance. The importance of and similarities between objects may be determined from user computer interactions with the objects. The user computer interactions may occur on a conventional desktop or laptop computer, or any other user-operated computing device such as a handheld computer, a digital cellular telephone, etc. For purposes of simplicity, these types of devices are referred to herein generally as computers. Association system 216 may be implemented as software that is stored on and executed by one or more such computers.

An integrated results listing 218 lists files that at least in part meet the search criteria, and also lists other computer objects (e.g., files, contacts, etc.) that have associations with files in preliminary results listing 212. In some implementations, integrated results listing 218 may order the files meeting the search criteria according relevance rankings, as are known in the art. The user can then access one or more desired files.

FIG. 3 shows as one implementation an integrated results listing 300 in which files 302 that are identified in a preliminary results listing 212 (FIG. 2) form a top-level listing 304. For each of files 302 in top-level listing 304 context-associated objects 306 (if any) are listed as a lower-level listing 308. FIG. 4 shows as another implementation an integrated results listing 400 in which files 402 that are identified in a preliminary results listing 212 (FIG. 2) are merged with context-associated objects 404 (if any) to form a generally one-level listing. The ordering of files 402 and context-associated objects 404 may be based upon relevance rankings, as are known in the art.

Figure 5:
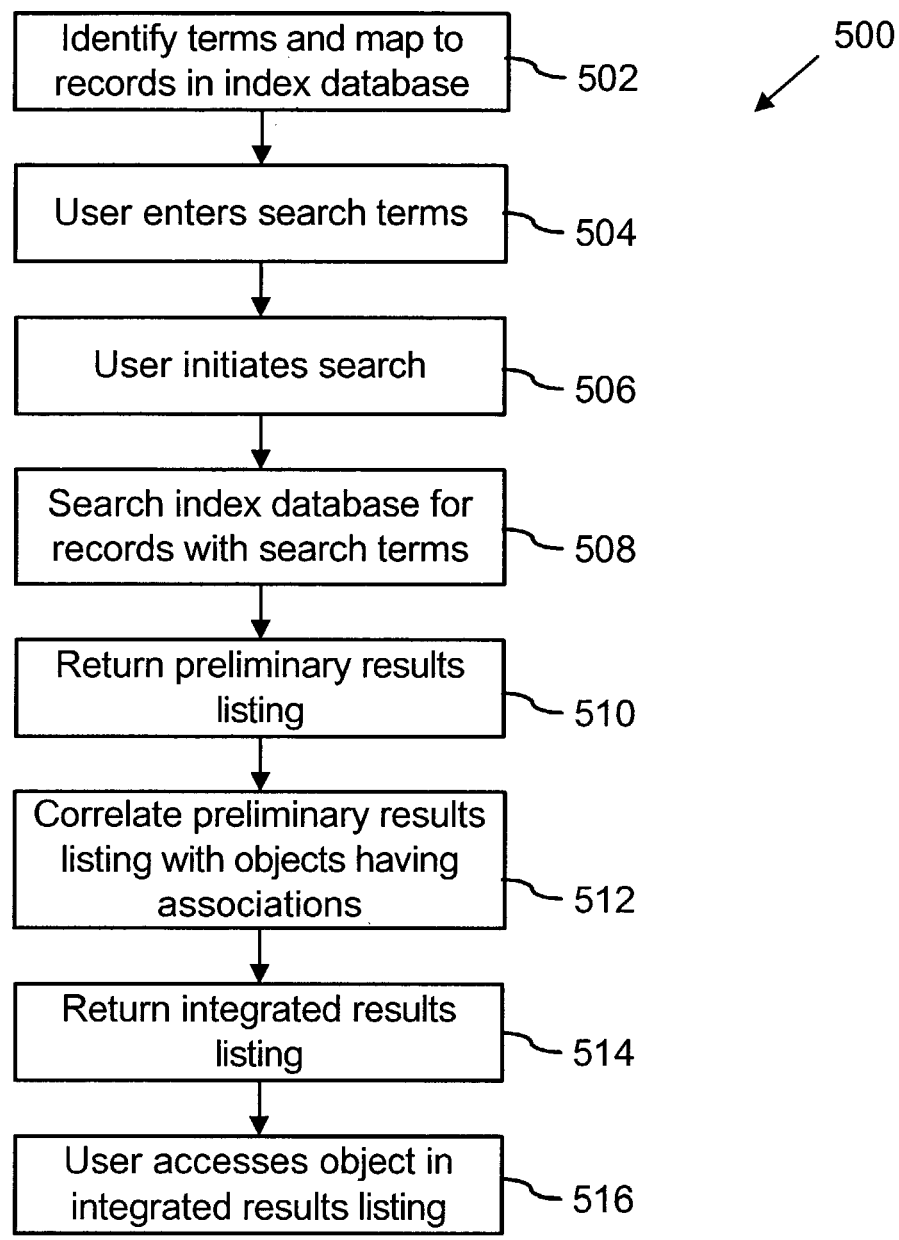
FIG. 5 is a flow diagram of an indexing and search method that provides indexing and searching of computer files or objects according to the present invention.

FIG. 5 is a flow diagram of a computer-implemented indexing and search method 500 that provides indexing and searching of computer files or objects. The searching of computer files may be used to identify or access files according to search terms selected by a user or could be a result of other operations in the system that, for example, observes a user's interaction with the computer and automatically generates a query, such as for the most frequently or most recently accessed contacts, files, etc.

The computer files may be any set of computer files. For example, the files may be dynamically generated on request by, for example, a script (such as a web server script) or as a result of a database query, or may be stored on a particular computer or a network or the files corresponding to one or more network-accessible sites of linked files (e.g., Web sites), for example. For purposes of illustration, the following description of FIG. 5 refers to files that are stored on a computer or a network.

In step 502 one or more selected terms or information are identified and retrieved from computer files and objects and the terms are stored or mapped to records in an index database (e.g, index database 206, FIG. 2). For each file, the one or more selected terms that are identified and retrieved may include any or all of a title, network address, filename, file description, specified keywords, file text, links within the file, etc., or any other information, which are stored with an identifier that identifies the file.

In step 504 a query is initiated to identify one or more computer files or objects. For example, a user searching for one or more selected files could enter one or more search terms or other search criteria in a search form (e.g., search form 208, FIG. 2). As another example, the query could be a result of other operations in the system that, for example, observes a user's interaction with the computer and automatically generates a query, such as for the most frequently or most recently accessed contacts, files, etc.

In step 506 the user initiates a search directed to the one or more search terms or other search criteria.

In step 508 the index database is searched for records that include the one or more search terms.

In step 510 a preliminary results listing (e.g., preliminary results listing 212, FIG. 2) is returned indicating files that at least in part meet the search criteria. In some implementations, the preliminary results listing may include relevance rankings for the listed files, as are known in the art.

In step 512 files indicated in preliminary results listing are correlated with other computer objects (e.g., files, contacts, etc.) that have associations with the files. The associations represent relationships between computer files (referred to generally as objects), which relationships are based upon user or other interactions between the objects. For example, the associations may be determined by association system 216 (FIG. 2).

In step 514 an integrated results listing is returned identifying files that at least in part meet the search criteria, and also identifying other computer objects (e.g., files, contacts, etc.) that have associations with the files meeting the search criteria.

In step 516 the user accesses one or more of the objects in the integrated results listing.

Figure 6:
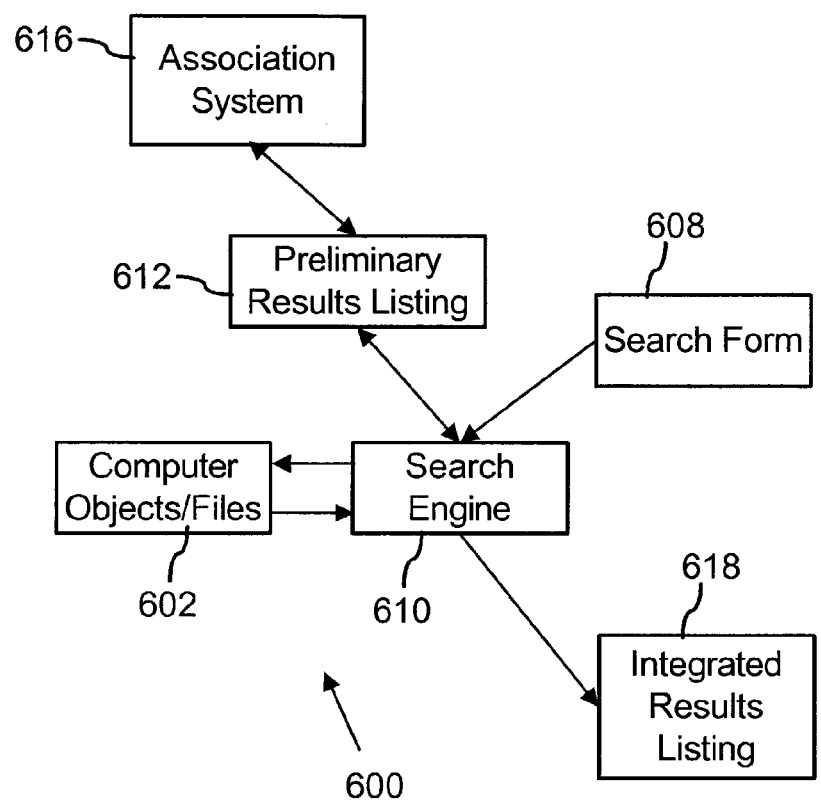
FIG. 6 is a block diagram illustrating an indexless search system that provides searching of computer files or objects according to the present invention.

FIG. 6 is a block diagram illustrating an indexless search system 600 that provides searching of computer files or objects 602 according to the present invention. The searching of computer files 602 may be used to identify or access files 602 according to search criteria selected by a user. The computer files 602 may be any set of computer files. For example, the files may be dynamically generated on request by, for example, a script (such as a web server script) or as a result of a database query, or may be stored on a particular computer or a network or the files corresponding to one or more network-accessible sites of linked files (e.g., Web sites), for example. For purposes of illustration, the following description of FIG. 6 refers to files 602 that are stored on a computer or a network.

A user searching for one or more selected files enters one or more search terms or other search criteria in a search form 608, which is rendered on a computer display (not shown) accessible by the user. The user initiates a search, whereby a search query with the one or more search terms or other criteria is sent to a search engine 610. Search engine 610 searches files 602 for one or more of the search terms or other criteria and returns a preliminary results listing 612 that lists files that at least in part meet the search criteria.

For each file, the one or more selected criteria may include any or all of a title, network address, filename, file description, specified keywords, file text, links within the file, etc., or any other information, which are stored with an identifier that identifies the file. In some implementations, preliminary results listing 612 may include relevance rankings for the listed files, as are known in the art. For example, the initial set can be generated by all kinds of queries like: "find files that were created in specified time interval" or "find persons that communicated with me last week" or "find sunny days in last 4 months".

Files in preliminary results listing 612 are correlated with other computer objects (e.g., files, personal contacts, etc.) that have associations with the files. The associations are identified and determined by an automatic association system 616 that automatically determines associations between user computer activities, computer objects (e.g., files, contacts, etc.), and other events. The associations determined by association system 616 represent relationships between computer files (referred to generally as objects), which relationships are based upon user or other interactions between the objects.

An integrated results listing 618 lists files that at least in part meet the search criteria, and also lists other computer objects (e.g., files, contacts, etc.) that have associations with files in preliminary results listing 612. In some implementations, integrated results listing 618 may order the files meeting the search criteria according relevance rankings, as are known in the art. The user can then access one or more desired files.

Figure 7:
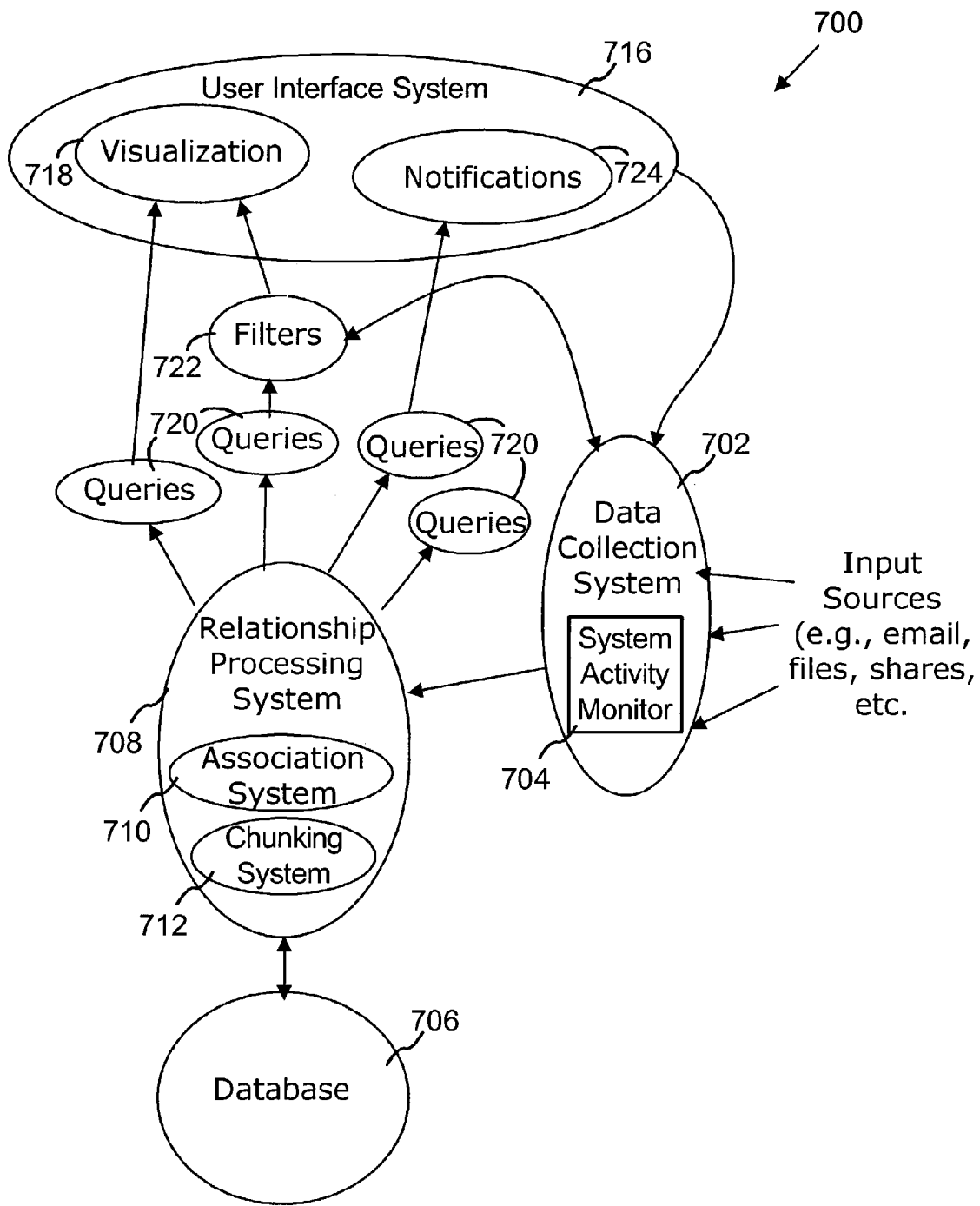
FIG. 7 is a functional block diagram of an automatic association system that automatically determines associations between user computer activities, computer objects (e.g., files, contacts, etc.), and other events.

FIG. 7 is a functional block diagram of an automatic association system 216 that automatically determines associations between user computer activities, computer objects (e.g., files, contacts, etc.), and other events. The associations allow association system 216 to identify computer files, contacts, and information (referred to generally as objects) that are related with each other by usage or user activities, for example.

As described below, associations between the objects may include similarities between them and their importance. The importance of and similarities between objects may be determined from user computer interactions with the objects. The user computer interactions may occur on a conventional desktop or laptop computer, or any other user-operated computing device such as a handheld computer, a digital cellular telephone, etc. For purposes of simplicity, these types of devices are referred to herein generally as computers. Association system 216 may be implemented as software that is stored on and executed by one or more such computers.

It will be appreciated, however, that associations between various objects need not result from direct user manipulations of a computer but, for example, could be based upon interactions between sub-networks (e.g., when electricity is down in San Francisco, Internet in Boston is 60% slower); weather patterns (e.g., it gets cloudy in Seattle when atmospheric pressure drops below a given value); or stock market price changes (AAA Co. and BBB Co. share prices will drop the next day after CCC Co. share price drops by 2%) . . . Moreover, associations may associate objects of different types (person to file, email message to file, etc).

Association system 216 includes a data collection system 702 that collects data relating to user computer activities, computer actions, interactions between the user and various computer objects (e.g., applications, files, communications, people, etc.), and other events. For example, data collection system 702 may collect data relating to computer system events (e.g., the operation of applications or other software elements, various operations on computer files, sharing of computer data or other objects, etc.), computer communications (e.g., email communications, instant messaging communications, etc.), external data (e.g., news, events, etc.), and people (e.g., names, email aliases, etc.).

In one implementation, data collection system 702 may include a system activity monitor 704, for example, that monitors user activity on a user-operated computer (not shown). System activity monitor 704 may be implemented as a computer program to which other applications, or the operating system, provide information of user computer activities, such as search queries, the opening or modification of a document or other file, etc. For example, while objects may exhibit many properties, searches performed by a user and the search results can indicate which properties are most important for the user. For each such activity, system activity monitor 704 creates or adds to a record of information (sometimes called "metadata") that is stored in a computer system database 706.

For example, system activity monitor 704 may include a universal input activity monitor that provides a single entry point for all user interactions with the computer, or at least specified user interactions with the computer. In this universal input implementation, system activity monitor 704 may determine and store as metadata in computer system database 706 any or all of the following: input method data (e.g., text, speech, mouse, etc.), input language data (English, Chinese, etc.), input mode data (e.g., dictation or typed command), input assistance data (e.g., typed word completion, command guessing, etc.), input feedback data (e.g., whether the computer needs additional information, corrections of wrong guesses by the computer, etc.), etc. For instance, if a user copies or stores a picture in a web browser, system activity monitor 704 could store the network address (e.g., Uniform Resource Locator, URL) of the source page, as well as the URL of the image itself, as metadata in computer system database 706.

Computer system database 706 stores information (e.g., "metadata") about computer files stored on and activities carried out on a computer. The metadata may include conventional information, such as is conventional for computer-generated documents, including when the file was created, who created it, and a modification history. Also, some types of computer file types may have specific metadata fields that are not applicable to other file types. For instance, the metadata fields for a photo file type may include the size of the image, where the picture was taken, who took it, who is in it, etc. In one implementation, new metadata fields can be added to database system 706 to accommodate new file types or to store new information about an existing file type.

Table 1A lists exemplary information that may obtained by system activity monitor 704 and stored in computer system database 706. With regard to the various computer files and computer information (referred to collectively as objects) a computer user might interact with, system activity monitor 704 may collect data relating to any or all of the creator/author of the object, the type of the object, any pointer to the object (if available), activation events, object size, etc. For example, system activity monitor 704 may obtain the information about the objects with which a computer user interacts, determine whether the objects are new or unique relative to other objects listed in computer system database 706 (e.g., based upon a unique object identifier), and aggregate or store the activities in computer system database 706 in association with the unique object identifier of the object.

TABLE 1A

Data Collection and Analysis

| Constructs | Operationalization | |
|---|---|---|
| | Data Collecting | Data Processing |
| Objects Users Interact With | | |
| General | creator/author of object, type of object, pointer to object if it still exists, activation events, object size | get information about objects, determine if new/unique & aggregate events at level of unique object ID, create association(s) |
| People | | |
| people in user's email | email client aliases | create association(s) |
| people in user's contact list | contact list files | create association(s) |
| people users IM, Chat with Communications | buddy list email aliases | create association(s) |
| Emails | email events (open, close), email addresses | create association(s) |
| phone messages | phone message events (open, close), email alias | create association(s) |
| instant messages | instant message (IM) session events (open, close), people | create association(s) |
| chat messages | chat session events | create association(s) |
| Files | | |
| any file created, opened, saved, played, sent, etc. | file names, place in directory, network URL | create association(s) |
| Web items | | |
| web pages | URLs | create association(s) |
| streaming items played | URLs | create association(s) |
| Notifications | type of notification, response notification | create association(s) |
| Applications | pointer to application | create association(s) |

The objects with which the computer user interacts may be associated with other people, communications with other people, computer files, network or Web items, computer system notifications, and applications run on or accessible by the computer. System activity monitor 704 can obtain and store in computer system database 706 for each of the listed types of exemplary information.

Association system 216 includes a relationship processing system 708 that determine one or more relationships between objects or metadata obtained by data collection system 702 or stored in computer system database 706. In one exemplary implementation, relationship processing system 708 includes a similarity or association system 710 that determines a degree of similarity or association between at least a pair of computer files or objects. Similarity or the degree of association may be represented, for example, as a numeric value between 0 and 1, where 1 would be identity between objects and 0 would indicate they are completely unrelated. Association system 710 may be implemented as one or more programs that, for a given target file and a collection of other files, return a similarity ranking between them.

It will be appreciated that different types of documents, files, or objects can have different types of similarity. For instance, two photos can look similar, could be taken at similar times, could be of a similar person, place, or event, could be the same color, could have been sent to the same people or printed together, could be parts of the same photo (e.g., one could have been cut from the other), etc. Table 1B lists exemplary associations or similarities that association system 710 may identify and store in computer system database 706. As indicated, the associations or similarities may relate to objects or files having shared content, occurring at similar times or similar computer locations (e.g., computer, directory, etc.), being sent to or received from a common person, are be linked together.

TABLE 1B

Data Collection and Analysis

| Constructs | Operationalization | |
|---|---|---|
| | Data Collecting | Data Processing |
| Context: Associations between Objects | | |
| Having shared content | cut/paste event, insert event, objects | level of commonality |
| | saved as event, objects | level of commonality |
| Occurring near in time | | |
| open on same machine at same time | open/close activation events, objects, date time of events | distance across times, overlapping sessions |
| Occurring near in "place" | | |
| on same machine | | |
| near each other in directory | machine name place in directory structure | min number of jumps through tree from one to the other |
| near each other in web | link event, links from, links to | store metadata in computer system database |
| on the same email | attachment events, objects | aggregate at level of communication |
| Being sent/received to one another | | |
| item sent to another person | sent event, objects | filtering through person and item collections |
| pointer of item sent to another person | insert event, objects | filtering through person and item collections |
| opened by a person | open event, objects | filtering through person and item collections |

TABLE 1B-continued

Data Collection and Analysis

| | Operationalization | |
|---|---|---|
| Constructs | Data Collecting | Data Processing |
| saved by a person | save event, objects | filtering through person and item collections |
| Activating one from within the other | | |
| items downloaded from a web page linked via a URL | download event, objects link event, objects, link from, link to | |

In one implementation, association system 710 could be instructed to ignore certain types of similarity, or to weight one type of similarity more heavily than another. Moreover, the associations or similarities tracked and identified by association system 710 could be extensible.

In addition, objects with which a user interacts can be of a different importance or significance to the user. For instance, a document that a user keeps open and edits of an extended period could be deemed to be of greater importance than a document that is opened for only a brief period of time. Likewise, a photo that is accessed and opened repeatedly could be deemed to be of greater importance that a photo that is only opened once. Table 1C lists exemplary factors by which association system 710, for example, could determine and store in computer system database 706 the relative importance of objects. As indicated, the importance factors may relate to the duration of user interactions, the frequency of interactions, the recency of interactions, as well as the immediacy of user responses, the amount of copying, duplication, and backups, and the extent objects are shared.

TABLE 1C

Data Collection and Analysis

| | Operationalization | |
|---|---|---|
| Constructs | Data Collecting | Data Processing |
| | Importance of Objects | |
| Duration of interaction | open and close activation events, object | session times calculated by min max time/date, then summed by object |
| | keyboard events, mouse events, object | summed by object |
| Frequency of interaction | activation events, date/times | count of unique activations/sessions |
| Recency of interaction | activation events, date/times | get maximum date |
| Immediacy of response to | | difference in time |
| Copying, duplication, backups | print, save as, multiple versions | |
| Sharing | show during meeting, share via email, used same object on a website, etc. | |

Relationship processing system 708 may further include a chunking system 712 that uses the degrees of similarity or association determined by similarity or association system 710 for an arbitrarily large set of objects or files and groups or "chunks" them into a specified number of sub-groups. For instance, given 216 photos, chunking system 712 could separate them into any number of sub-groups or chunks based on one or more criteria such as the dates they were taken, or who is in the photos, for example. The criteria to be used by chunking system 712 may be pre-defined or specified by a user, for example, and in one implementation can place the same item into several chunks (e.g., a picture of Bob and Sue would go into a Bob chunk as well as a Sue chunk). Chunking system 712 may be implemented as one or more programs stored on the computer.

An association user interface system 716 utilizes information stored in computer system database 706 by system activity monitor 704, as well as information determined by similarity or association system 710 and chunking system 712 to display visualizations 718 illustrating associations between computer system files, computer information, and other information. Visualizations 718 may be based upon the results of database queries 720 to which, in some instances, data filters 722 are applied. In addition, user interface system 716 can provide application and system notifications 724, as described below in greater detail.

Accordingly, association system 216 accommodates innate human memory, which works by association so that events are often remembered as happening in relationship to other events. In contrast, conventional computer file systems force users to use and remember arbitrary, out-of-context filing structures. With the significant numbers of computer files and objects that many users interact with, conventional out-of-context filing structures can make it difficult, or impossible, for users to find and access computer information that was worked on or viewed in the past. Association system 216 allows a user to view and assign searchable metadata and to retrieve documents, objects or files that match selected metadata.

Figure 8:
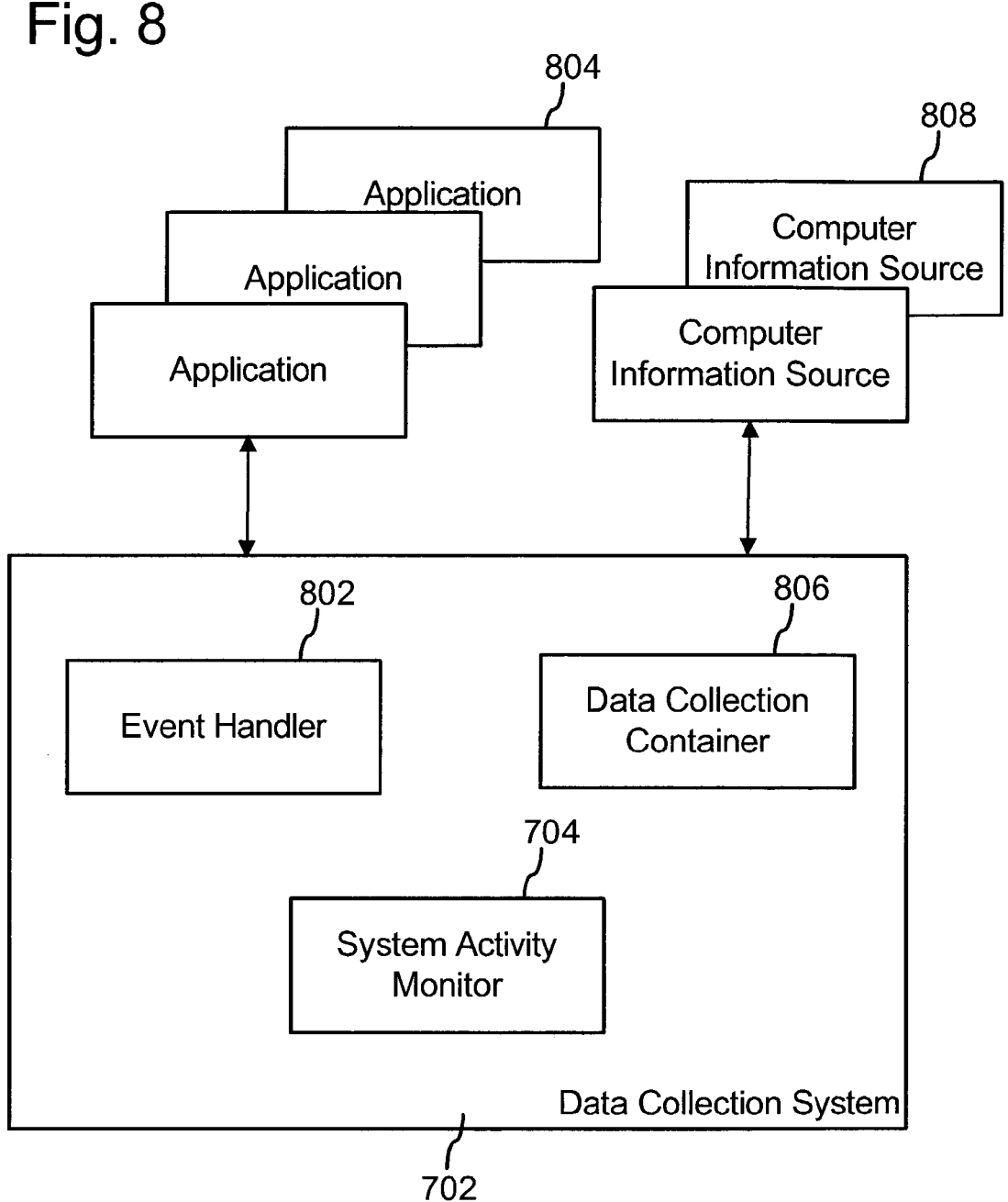
FIG. 8 is a detailed block diagram of one implementation of a data collection system in the association system of FIG. 2.

FIG. 8 is a detailed block diagram of one implementation of data collection system 702. In addition to system activity monitor 704 for monitoring user computer activity, for example, data collection system 702 can also include any or all of the following, including an event handler 802 through which one or more applications 804 (including other software services) send metadata information about application events to data collection system 702 and receive metadata information about application events from data collection system 702. Applications 804 may be separate from an underlying operating system for the computer, or may be services or features provided by the operating system.

A data collection container 806 operates to control system activity monitor 704, event handler 802, and any other data collection modules, and particularly controls data collection relating to system activity, such as copy and paste between documents, incoming and outgoing messages, opening shared files, etc. In addition, data collection container 806 can operate to obtain or receive common data (like weather, news), other than data relating specifically to operation or use of the computer, from one or more separate computer information sources 808 (e.g., public servers).

Applications 804 running on a computer with automatic association system 216 could register with event handler 802 to receive enhanced document management functionality. In particular, data collection container 806 supports cross-application integration that allows collection of data or information about cross-application events, such as copy and paste between documents, attaching a document to an email message, etc., thereby allowing relationships between objects to be determined or derived by relationship processing system 708. Moreover, applications 804 can interact directly with data collection system 702 to provide contextual information not readily available to system activity monitor 704. For example, if an email attachment is saved to disk as a separate file, the email application 804 may create a link between this file and the original email message (and, by extension, with the message sender). Control system activity monitor 704 and event handler 802 allow data to be collected at high efficiency and at a high granularity level, and with the minimal amount of processing required. In addition, data collection system 702 in one implementation may be extensible to allow for the installation of additional data collectors that may be developed in the future.

In one implementation users are notified that the data is collected and what it is used for. Users are provided one or more controls to selectively enable or disable the data collection, or explicitly adjust the importance of objects and their association weights, as described below. In other implementations, the ways in which the data is collected may be modified automatically based on how the data is used. While data is typically collected at the level of an individual user and computer, it will be appreciated that the data from multiple users and their computers could be combined. For such a shared data implementation, system 216 will provide unique identifiers for the data, objects and sessions, consistent handling of to- and from-fields for communications, replication of event identifiers across computers in shared sessions, privacy, and so forth.

Figure 9:
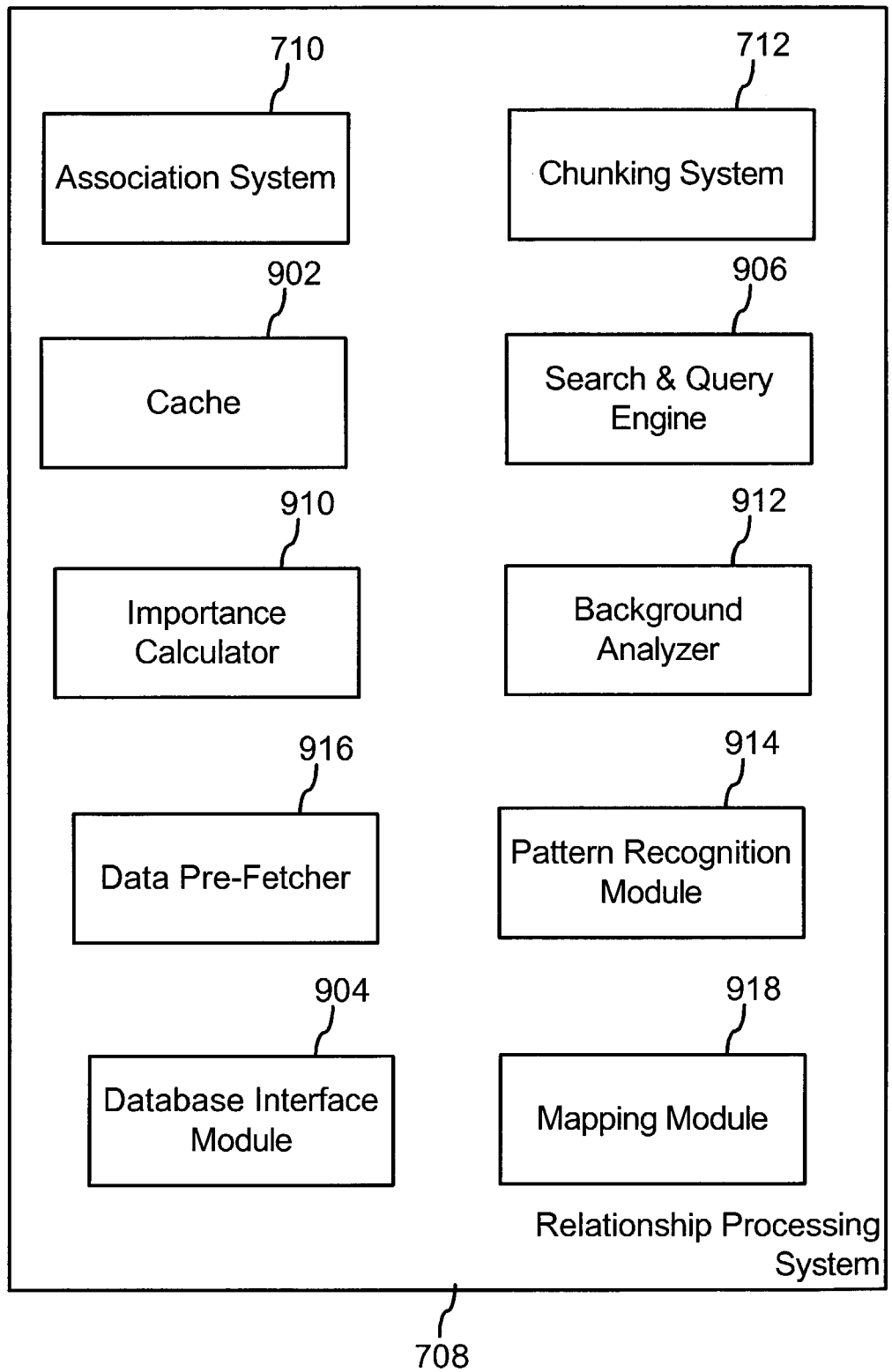
FIG. 9 detailed block diagram of one implementation of a relationship processing system.

FIG. 9 is a detailed block diagram of one implementation of relationship processing system 708. In addition to association system 710 and chunking system 712, for example, relationship processing system 708 can further include any or all of a variety of other components. In connection with accessing and interfacing with database 706, relationship processing system 708 can include a cache 902 to store temporarily metadata so that associations, such as second order associations, can be determined more readily than if the data had to be retrieved from database 706 for each association determination. Information in database 706 can be accessed through a database interface module 904 to unify and standardize the manner of adding data from various sources to database 706, and a search and query engine 906 can provide access to the data in database 706.

Association system 710 can determine direct or indirect relationships between two objects or make relationship measurements according to selected criteria, as described below with reference to exemplary implementations relating to social relationships between people and date-based relationships between various objects. Likewise, an importance calculator 910 can calculate the importance of an object based on the history of user interactions with it.

For example, importance calculator 910 can return an importance ranking between a target object and one or more other objects. Importance can be represented as a number between 6 and 1, where 1 would be absolute importance and 6 would be completely unimportant. Importance may be determined by a number of calculations of recency, number of edits, sending or receipt of a document from a frequently contacted user, duration, read order, frequency, etc. The extent of similarity or association (from the association system 710), importance (from importance calculator 910), and context may be combined to determine an extent of association between objects, etc.

It will be appreciated that importance and association rankings can vary according to the context of an event. An importance ranking may be provided for a target file in a particular context, which may include a file or collection of other files or a project, a particular time of day, a particular application or service, etc. For example, a user can receive email from her architect in the context of her house construction project. The context is an object or set of objects in the system. This could be one or more files, applications, or persons, a time of day, etc.

In some implementations, relationship processing system 708 can include a background analyzer 912 that operates on metadata from database 706 other than in response to a current database query to generate additional metadata. For example, background analyzer 912 could apply face recognition to graphic files and apply metadata tags when predefined faces are recognized. Likewise, a pattern recognition module 914 could seek to identify non-trivial repetitive user tasks from user activities. A data pre-fetcher 916 could provide "smart" pre-fetching of metadata for a current task from database 706 or cache 902.

In connection with providing additional data analysis, relationship processing system 708 may further include any or all of the following components. A mapping module 918 can provide spatial representations (e.g., two-dimensional) of data based on relationships, and the spatial representations can then be used to render and navigate graphical relationship maps or visualizations, one of which is described below with reference to a social map implementation. Clustering or "chunking" module 712 functions to group a given set of data objects into multiple clusters, "chunks," or sub-groups according to predefined criteria.

Chunking module 712 may selectively apply strict categorization, in which each data object is associated with only one sub-group, or fuzzy categorization in which data objects may be associated with more than one sub-group. In addition, relationship processing system 708 may include modules (not shown) to provide filtering of data objects based on a user's current task context and type of relationship, sorting of objects based on the current task context and type of relationship, prediction/automation to generate or find a set of data objects based on a user's current context and recorded patterns, and a search-by-relationship module that searches for data objects that are related to a selected one, such as searching for data objects related to a person (emails, docs, meetings, photos . . . ), for example.

Figure 10:
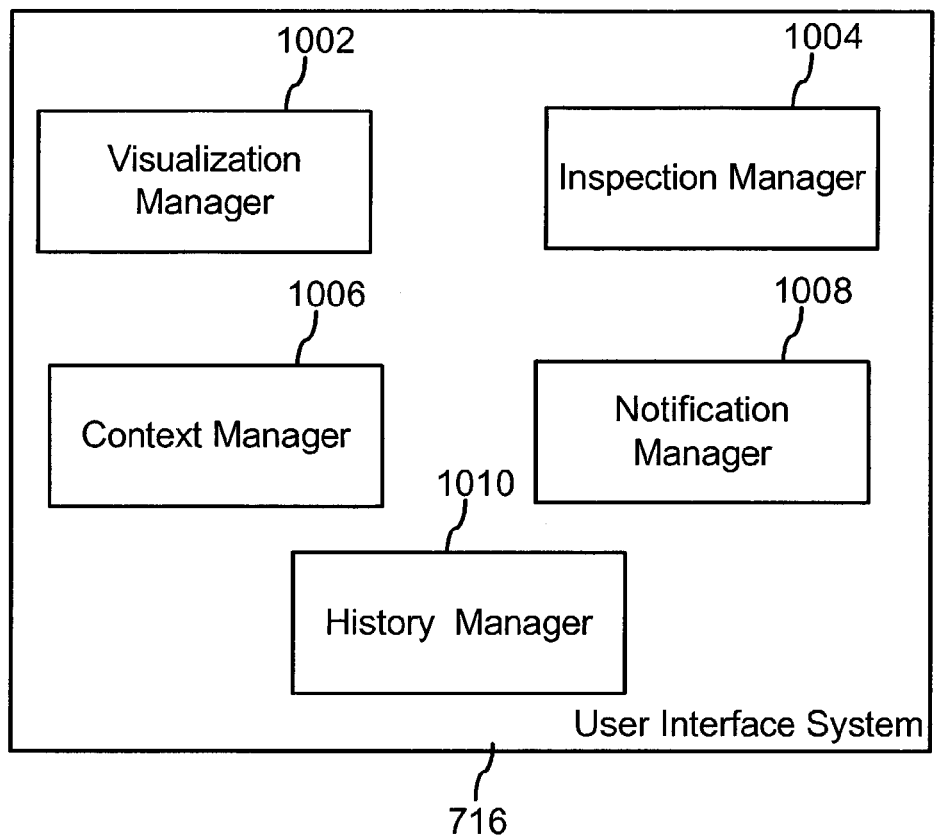
FIG. 10 is a detailed block diagram of one implementation of a association user interface system in the association system of FIG. 7.

FIG. 10 is a detailed block diagram of one implementation of association user interface system 716, which can include any or all of the following components. A visualization manager 1002 provides visualizations (e.g., graphical) that can be rendered on computer display screens for sets of data, as described below in greater detail. In some implementations, new visualizations can be added to visualization manager 1002 and the visualizations can exist across application contexts. Examples of visualizations that can be provided by visualization manager 1002 include stacks of objects (e.g., photos), data maps (e.g., a map of social relationships between people, as described below), hierarchies, calendars, etc. An inspection manager 1004 can provide a standard way or format for obtaining and displaying relevant information about a particular item in a particular context, such as a stack viewing cone, drop-down menu, an operating system left-hand info pane, etc A context manager 1006 may be included to provide a task-oriented workspace that tracks the context within which a user is working. A context is the set of all of the objects, tools, applications, and data that is relevant to a particular task that the user is performing. In some implementations, contexts can be recalled instantly and can also be shared with other people. For example, a collection of emails about planning a party could be a context.

A notification manager 1008 can provide to the user system and application notifications 724 (FIG. 7) indicating that something has happened. In some implementations, notifications from applications are provided to the user through the notification manager 1008. The notification manager 1008 prioritizes system and application notifications and then provides them through visualization manager 1002. In some implementations, a history manager 1010 records (e.g., in a single record) what has happened on the computer. As described below in greater detail, history manager 1010 can function as a smart, deep UNDO utility that can determine what was done when, and how to undo it. History manager 1010 features operations such as like UNDO, BACK, and versioning. The history manager 1010 can also be populated with external events, such as news headlines and weather.

History manager 1010 builds, stores, and indexes a deep representation of user computer actions. In one implementation, history manager 1010 is a low-level aspect of association system 700 to provide one mechanism for all history, whether it is user computer activity history, application history, or even external history (such as news events).

Figure 11:
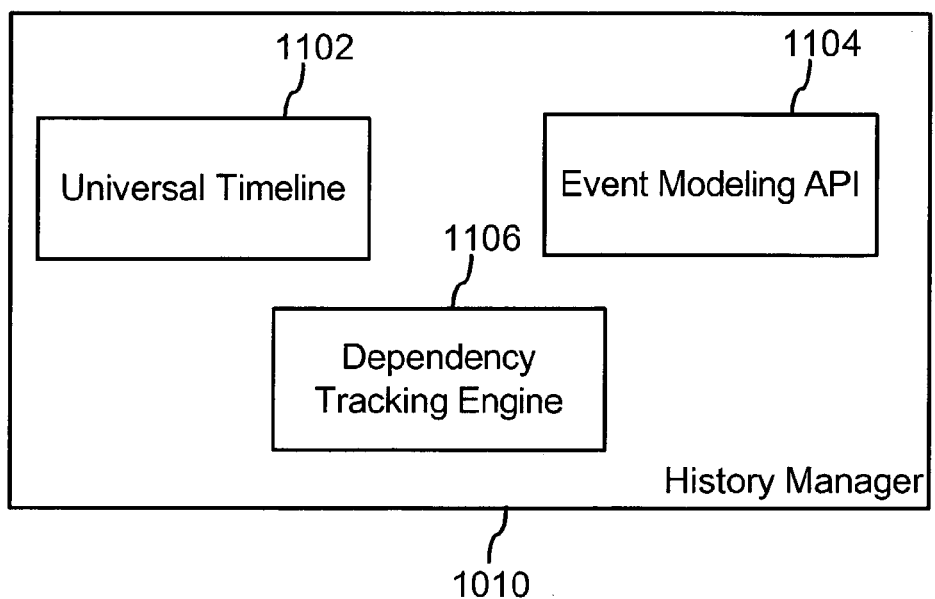
FIG. 11 is a detailed block diagram of one implementation of a history manager included in the user interface system of FIG. 10.

FIG. 11 is a block diagram of one implementation of history manager 1010, which includes a continuous, scalable, universal timeline 1102 in which user computer activity history, application history, etc. are represented at a variety of levels, from atomic keystrokes to entire weeks' worth of work. The user can view, query, and manipulate the history in virtually any time scale.

Applications and system services interact directly with an event modeling API 1104 to add events to timeline 1102. Events could include lower-level actions together with context that could be provided by the application and association system 200. For example, event modeling API 1104 could record keystrokes that are entered into a word processor, together with a context from the word processor that the keystrokes correspond to footnote text. This event might also be associated with other editing changes into a single "edit document" event that spans an entire day. As another example, an email client application could add a record of an email message being opened, complete with context about the sender, the subject, and the thread. The system might add additional context about what other applications are open at the same time and how long the email message remains open and visible on the display screen.

A dependency tracking engine 1106 could employ one or more schemas to represent changes and their dependencies. Dependency tracking engine 1106 could use these schemas to provide users with flexibility in their temporal navigation tasks. For instance, subsequent changes to an object are rendered irrelevant if a user goes back in the history to delete the object. In one implementation, dependency tracking engine 1106 can also track casual changes and dependencies between events. For instance, if a user resizes every photo in a directory and then performs an undo of the initial size change and re-does it differently, dependency tracking engine 1106 could hypothesize that the user wants to undo and redo the size changes on all of the other images. In addition, dependency tracking engine 1106 can track where computer objects originated and the context when they were created. As a result, changes made to root documents can be propagated throughout an inheritance chain.

Some of these features are currently available in some in version control systems, such as Visual Source Safe, available from Microsoft Corporation. In some version control systems users see the entire history of a document and can also have limited ability to add and remove specific changes to and from a document. The difference is that version control systems lack semantic knowledge about what changes are made. For instance, while it could record that a .cpp file and a .h file have been modified, a conventional version control system does not know that taken together, these two changes altered the name of a property on an object.

In accordance with the practices of persons skilled in the art of computer programming, the present invention is described above with reference to acts and symbolic representations of operations that are performed by various computer systems and devices. Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, we claim as my invention all such embodiments as may come within the scope and spirit of the following claims and equivalents thereto.

The invention claimed is:

1. Software for an indexing and searching system having computer executable instructions stored on a computer-readable medium, comprising:

software for conducting a search of an index database to identify preliminary results, listing one or more selected computer objects having identifying information stored in the index database;

software for correlating the one or more selected computer objects of the preliminary search results with one or more other computer objects that have associations with the selected computer objects of the preliminary search results, the associations are discerned automatically based upon monitoring user activity on a user-operated computer, wherein a universal input activity monitor provides a single entry point for all user interactions with the computer, the universal input activity monitor determines and stores as metadata in a computer system database input method data, input language data, input mode data, input assistance data and input feedback data, wherein the user activity comprises, computer communications, computer system events and interactions between the user and computer objects, and wherein the associations are then ranked based on a degree of similarity between a given pair of computer objects and a similarity ranking is returned; and software for returning integrated search results that include the preliminary search results with one or more other computer objects that have associations with the selected computer objects of the preliminary search results.

2. The software of claim 1 in which the integrated search results include first and second information levels, the first information level corresponding to the preliminary search results and the second information level corresponding to the one or more other computer objects that have associations with the selected computer objects of the preliminary search results.

3. The software of claim 1 in which the integrated search results list the preliminary search results in a single information level with the one or more other computer objects that have associations with the selected computer objects of the preliminary search results.

4. The software of claim 1 in which the one or more selected computer objects include computer files that are stored on a selected computer or network site.

5. The software of claim 1 in which the one or more selected computer objects include computer files that correspond to a network site of linked files.

6. A computer-implemented indexing and searching method that provides improved searching of computer files and objects, comprising the following computer-executed acts:
  conducting a search of an index database to identify preliminary results, listing one or more selected computer objects having identifying information stored in the index database;
  correlating the one or more selected computer objects of the preliminary search results with one or more other computer objects that have associations with the selected computer objects of the preliminary search results, the associations are determined based on monitoring user activity on a user-operated computer and recording the user activity as metadata in a computer system database, wherein a universal input activity monitor provides a single entry point for all user interactions with the computer, the user interactions comprise input method data, input language data, input mode data, input assistance data and input feedback data, wherein the user activity comprises, computer communications, computer system events and interactions between the user and computer objects, and wherein the associations are then ranked based on a degree of similarity between a given pair of computer objects; and
  returning integrated search results that include the preliminary search results with one or more other computer objects that have associations with the selected computer objects of the preliminary search results.

7. The method of claim 6 in which the integrated search results include first and second information levels, the first information level corresponding to the preliminary search results and the second information level corresponding to the one or more other computer objects that have associations with the selected computer objects of the preliminary search results.

8. The method of claim 6 in which the integrated search results list the preliminary search results in a single information level with the one or more other computer objects that have associations with the selected computer objects of the preliminary search results.

9. The method of claim 6 in which the one or more selected computer objects include computer files that are stored on a selected computer or network site.

10. A computer display having rendered thereon results of a search by an indexing and searching system, comprising the following computer-executable components:
  a first search results component that includes one or more selected computer objects having identifying information stored in an index database of the indexing and searching system; and
  a second search results component that includes one or more other computer objects that have associations with the selected computer objects of the first search results component, the associations are discerned automatically based upon monitoring user activity on a user-operated computer, wherein a universal input activity monitor provides a single entry point for all user interactions with the computer, the universal input activity monitor determines and stores as metadata in a computer system database input method data, input language data, input mode data, input assistance data and input feedback data, wherein the user activity on a computer comprises, computer communications, computer system events and interactions between the user and computer objects, and wherein the associations are then ranked based on a degree of similarity between a given pair of computer objects and a similarity ranking is returned.

11. The display of claim 10 in which the first and second search results components are rendered as first and second information levels, respectively.

12. The display of claim 10 in which the first and second search results components are rendered as a single, integrated information level.

13. The display of claim 10 in which the one or more selected computer objects include computer files that are stored on a selected computer or network site.

14. Software for an indexing and searching system having computer executable instructions stored on a computer-readable medium, comprising:
  software for conducting a search of an index database to identify preliminary results, listing one or more selected computer objects having identifying information stored in the index database;
  software for correlating the one or more selected computer objects of the preliminary search results with one or more other computer objects that have associations with the selected computer objects of the preliminary search results,
  software for automatically determining the associations between the one or more selected computer objects of the preliminary search results with one or more other computer objects based upon based upon monitoring user activity on a user-operated computer and recording the user activity as metadata in a computer system database, wherein a universal input activity monitor provides a single entry point for all user interactions with the computer, the user interactions comprise input method data, input language data, input mode data, input assistance data and input feedback data, wherein the user activity comprises, computer actions and interactions between the user and computer objects, and wherein the associations are then ranked based on a degree of similarity between a given pair of computer objects; and
  software for returning search results that include one or more other computer objects that have associations with the selected computer objects of the preliminary search results.

15. The software of claim 14 in which the associations include relationships between computer objects based upon related interactions other than a search by the indexing and searching system.

16. The software of claim 14 in which the associations are discerned automatically based upon user activity on a computer.

17. The software of claim 14 in which the one or more selected computer objects include computer files that are stored on a selected computer or network site.

18. The software of claim 14 in which the one or more selected computer objects include computer files that correspond to a network site of linked files.

* * * * *